Feb. 12, 1952
E. S. WALKER
2,585,881
DEVICE FOR CUTTING WORMS FOR FISH FOOD
Filed Nov. 3, 1949
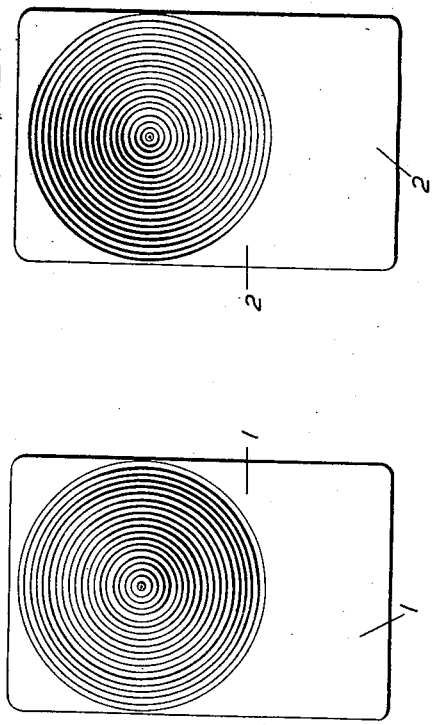
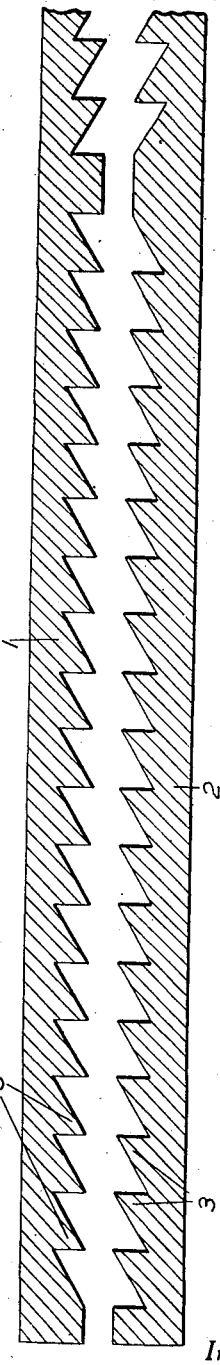
Inventor
*Ernest S. Walker*

Patented Feb. 12, 1952

2,585,881

UNITED STATES PATENT OFFICE 2,585,881

DEVICE FOR CUTTING WORMS FOR FISH FOOD

Ernest Samuel Walker, South Yardley, Birmingham, England

Application November 3, 1949, Serial No. 125,327
In Great Britain November 9, 1948

1 Claim. (Cl. 241—168)

This invention relates to means for cutting material into small pieces and particularly for preparing food for fishes. Live food, such as worms, for small fishes, require to be in a very fine condition, and this invention has for its object a simple device for preparing the food.

According to the present invention, cutting teeth are formed in or on the faces of two plates or members made of material which may be non-rustable or not detrimentally affected by water or any food to be prepared. A worm or other material is placed between the cutting teeth on the two plates which are slid over one another to affect the cutting or grinding action.

Referring to the drawings:

Figure 1 is a view of the cutting face of one plate.

Figure 2 is a face view of the other cutting plate, and

Figure 3 is a cross section of the two plates.

According to a convenient embodiment of this invention, annular concentric grooves are cut in the flat faces of stainless steel plates 1 and 2, the grooves being shaped in cross-section to form ratchet-like teeth 3. In one plate 2 the cutting teeth face inwardly towards the centre of the toothed surface, whilst the cutting teeth on the other plate 1 face outwardly. Conveniently, the cutting teeth cover a circular area. Thus when one plate is moved over the other plate, to move the centre of one toothed area outwardly or radially in relation to the other toothed area, the shearing action will be on one side of the centre of the toothed area tending to keep the food in the area of the cutting teeth, and by giving an eccentric relative movement to the plates, the worm or other material is quickly ground or cut into an extremely fine condition. The cutting edges of the teeth are level with the surfaces of the plates and a portion of the plates have plain surfaces to slidably guide the plates on one another. The plates can then be inserted into the water to wash off the food thereinto. The cutting teeth 3 are formed on one end of the plates and the other end of the plates form hand grips. In a further form of the invention, cutting teeth may be formed by turning a spiral groove in the plates. Mint leaves or the like can also be cut into small pieces between the two plates and the leaves can be cut or ground into such small pieces that the cells of the leaves are broken down which frees the liquid in the cells.

Having thus described the invention, what is claimed as new and desired to be secured by Letters Patent, is:

A device for preparing and feeding worms to fish comprising two thin block like members to be superposed upon each other, the confronting faces of the pair of members each having annular grooves therein, one face of the grooves being at right angles to the confronting faces while the opposite faces of the grooves are annular conical surfaces, the meeting of the surfaces forming sharpened annular cutting edges, the annular conical surfaces facing in opposite direction on the two members so that the cutting edges are in shearing relation when the members are superposed, a plurality of flat surface landings on the grooved faces of each member surrounding and at the center of the grooved portions and extending out from the members and into contact with each other and into substantially the plane of the cutting edges, whereby, when a live worm is placed between the members and the said members are manually slid against each other, the worm is cut into small segments after which the members are separated and placed into a tank of fish to feed the fish.

ERNEST SAMUEL WALKER.

REFERENCES CITED

The following references are of record in the file of this patent:

UNITED STATES PATENTS

| Number | Name | Date |
| --- | --- | --- |
| D. 30,175 | Wagner | Feb. 14, 1899 |
| 17,985 | Sanford | Aug. 11, 1857 |
| 226,337 | Metcalf | Apr. 6, 1880 |
| 265,160 | Shumaker | Sept. 26, 1882 |
| 1,269,399 | Davis | June 11, 1918 |
| 1,425,830 | Bell | Aug. 15, 1922 |
| 100,853 | Crosmann | Aug. 18, 1936 |
| 2,154,650 | Wishinsky | Apr. 18, 1939 |
| 2,155,793 | Komaki | Apr. 25, 1939 |